UNITED STATES PATENT OFFICE.

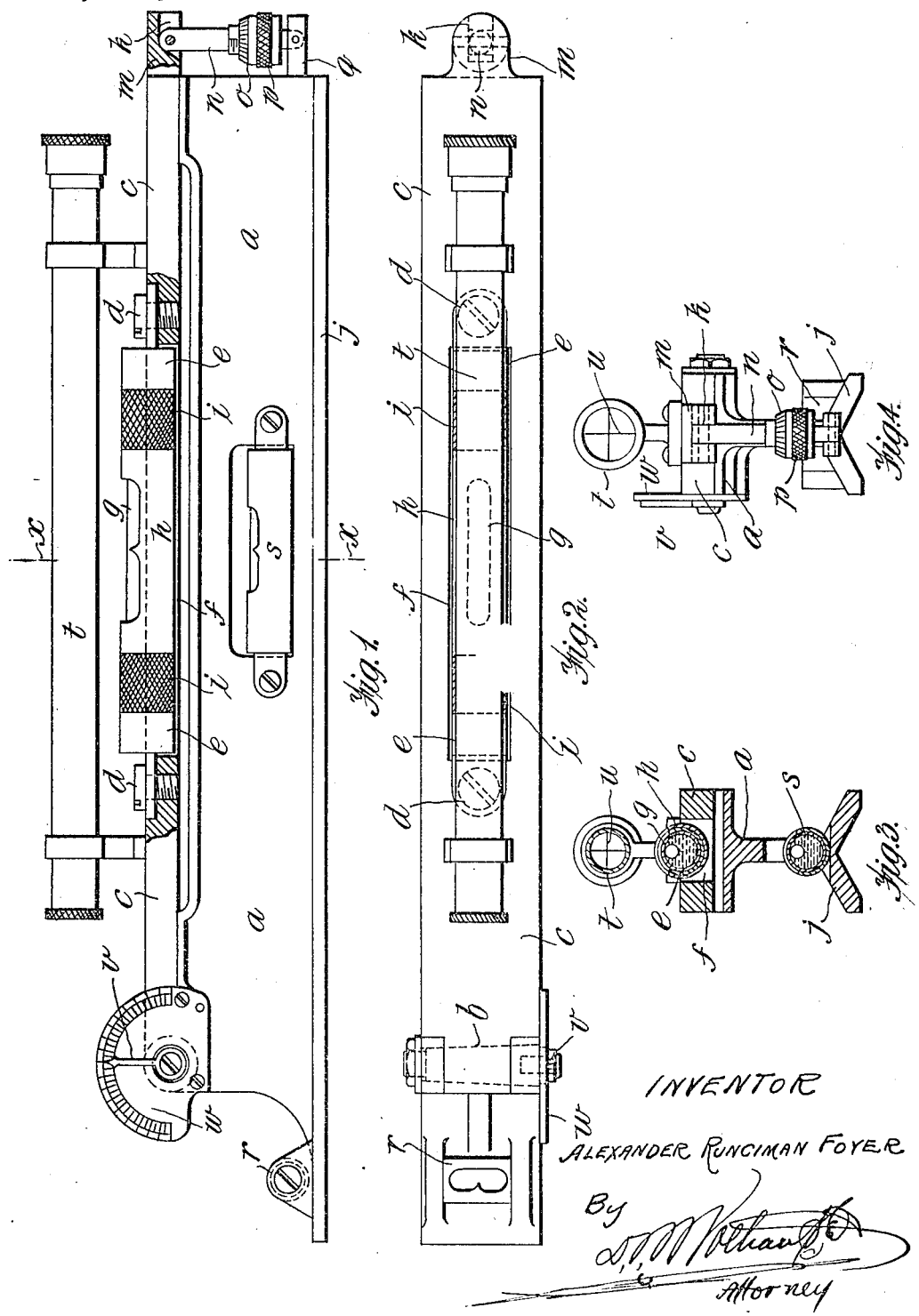

ALEXANDER RUNCIMAN FOYER, OF OTTOSHOOP, TRANSVAAL, SOUTH AFRICA.

ADJUSTABLE AND REGISTERING LEVEL.

1,292,595.  Specification of Letters Patent.  Patented Jan. 28, 1919.

Application filed December 24, 1917. Serial No. 208,689.

*To all whom it may concern:*

Be it known that I, ALEXANDER RUNCIMAN FOYER, a subject of the King of Great Britain and Ireland, and resident of Ottoshoop, Transvaal, South Africa, have invented a certain new and useful Improvement in Adjustable and Registering Levels, of which the following is a specification.

My invention relates to a level of the ordinary spirit or ether bubble type in which the level may be adjusted by means of a micrometer adjustment.

The object of my invention is to use an ordinary bubble level in such a manner that by adjustment the elevation of any unlevel surface may be indicated, and thereby in fitting up very heavy machinery or long spans, the accurate dimensions of packing or the like may be determined by one operation.

The accompanying drawings illustrate a practical method of and means for carrying the invention into practice, although it will be apparent that the invention as defined by the scope of the appended claims is susceptible to modification.

Figure 1 is an elevation of the device partly in section.

Fig. 2 is a plan view thereof.

Fig. 3 is a sectional elevation on line $x$, $x$ of Fig. 1.

Fig. 4 is an elevation of the back or adjustable end thereof.

Similar letters of reference indicate corresponding parts throughout the several views.

To a metal body or frame $a$ there is pivoted on a slightly conical pin $b$, to insure perfect and non-vibratory movement, one end of a face plate $c$ on which is mounted by means of lugs held in place by screws $d$ a metal case $e$ which occupies a centrally cutaway recess $f$ in said face plate. The case $e$ which carries a spirit or ether level $g$ is provided with a case $h$ which may be revolved by its milled portions $i$ so as to protect the level tube $g$ when not in use. The face plate $c$ when in its normal position, and the base $j$ of the body or frame $a$, when perfectly level, should show a true central bubble in the level tube $g$. In a recess $k$ is an extension $m$ at the other end of the face plate $c$ there is pivotally mounted the end of the pin $n$ of a micrometer gage, represented by $o$, $p$, said gage, which is pivotally connected to a bracket $q$ formed integral with or attached to the body or frame $a$, being operated by its milled ring $p$ in the known manner. Therefore the face plate $c$ may be raised or lowered relatively to the body $a$ and the bubble of the level $g$ brought to its normal position irrespective of the actual angle of the surface upon which the body $a$ rests. The base $j$ of said body $a$ is preferably V-d inversely so that it may serve for leveling shafting as well as plain surfaces. A transverse level $r$ with the bubble indicating at right angles to level $g$ is provided, but is not adjustable by other movement than that of the body $a$ transversely. A check level $s$ is let into the vertical flat web of the body $a$ so that the difference in elevation may be in some measure checked. For long ranges, a sighting tube $t$ with cross wires $u$ similar to those used upon surveying instruments and the like is fixed to the upper surface of the face plate $c$ thus increasing the range thereof. To the pivot pin $b$ is attached a pointer $v$, registering from zero or absolute level to any angle upon either side thereof upon a suitable protractor scale $w$ attached to the body $a$.

In operation, the length of the surface to be leveled is ascertained, and the portion to which the adjustable level according to my invention is to be applied forms therefore a determinable fraction thereof, and when the bubble is, by means of the micrometer screw, set at or returned to its level position the amount of elevation may be read off upon the micrometer scale, and in inches per foot or millimeter per meter, or any other scale, enabling exact vertical adjustment to be made in the way of packing or the like, thus saving labor, crane work and much casual adjustment. Furthermore, the exact inclination of the beam or the like from the horizontal is ascertainable in degrees from the scale $w$. When adapted to a tripod stand, and the sighting tube $t$ used for leveling distant points, the adjustable level is well adapted for rough surveying operations for drainage levels and the like.

Having now described my invention, what I claim as new and desire to secure by Letters Patent of the United States is:—

1. An adjustable and registering level including a base, a face plate pivoted to said base, a pointer on said pivot and movable over said face plate, a protractor scale secured to the base and on which the pointer indicates angles, a bubble level mounted in said hinged face plate, and a micrometer adjustment to said hinged face plate for truing the bubble and registering purposes.

2. An adjustable and registering level including a base with a vertical flat web having mounted therein a longitudinal check bubble level, said base having its bottom portion V-d inversely, a pivoted face plate, a bubble level mounted in said pivoted face plate, and a micrometer adjustment to said pivoted face plate for truing the bubble and registering purposes.

3. An adjustable and registering level including a base with a vertical flat web having mounted therein a longitudinal check bubble level, said base having its bottom portion V-d inversely in order that the level may be adapted and applied to curved or flat surfaces, a transverse bubble level mounted on said base, a face plate pivoted to said base with a sighting tube on its upper surface, a central cut-away recess in the face plate below the sighting tube, a bubble level mounted by lugs and securing screws in said recess, a revoluble protective casing for said level with milled portions thereto, a pointer on the pivot of the face plate and movable with same in conjunction with a protractor scale secured to the base and with which the pointer coöperates to indicate angles between the plane of the base and the true horizontal, an extension to the end of the pivoted face plate and a lug on the corresponding end of the base with a coöperative micrometer adjustment between the extension and lug.

In testimony whereof I have affixed my signature in presence of two witnesses.

ALEXANDER RUNCIMAN FOYER.

Witnesses:
A. HAMMOND,
E. GRANT.